May 24, 1966 W. R. EVANS 3,253,190

ELECTRICAL CONNECTOR AND ELECTRICAL CONTACT

Filed July 17, 1963 3 Sheets-Sheet 1

INVENTOR.

WILLIAM R. EVANS

BY

Curtis, Morris & Safford

ELECTRICAL CONNECTOR AND ELECTRICAL CONTACT

Filed July 17, 1963 3 Sheets-Sheet 2

INVENTOR.
WILLIAM R. EVANS
BY
Curtis, Morris & Safford

ELECTRICAL CONNECTOR AND ELECTRICAL CONTACT

Filed July 17, 1963 3 Sheets-Sheet 3

INVENTOR.
WILLIAM R. EVANS
BY
Curtis, Morris + Safford

United States Patent Office 3,253,190

Patented May 24, 1966

3,253,190
ELECTRICAL CONNECTOR AND ELECTRICAL CONTACT

William R. Evans, Hershey, Pa., assignor to AMP Incorporated, Harrisburg, Pa.

Filed July 17, 1963, Ser. No. 295,726

16 Claims. (Cl. 317—101)

This invention relates to electrical connecting means for quickly and accurately connecting a plurality of electrical modules embodying an assembly of electrical elements to circuitry extending longitudinally along an elongated member having recesses or slots therein to receive pluggable means on the modules and thereby connect the same to said circuitry. More particularly, the invention is directed to such electrical connecting means adapted to connect such modules to a memory frame matrix assembly. Not only are the electrical connecting means respectively provided upon the modules and memory frame matrix capable of being coupled to each other and uncoupled quickly, without requiring the use of tools, but such connecting means also are primarily adapted to maintain high reliability in assuring maintenance of circuit continuity after connection is established between coengageable contacts comprising such electrical connecting means.

One very practical field of use for the present invention is that pertaining to diode modules which are to be quickly connected to and disconnected from various memory circuits connected to said memory frame matrix assembly. Electrical equipment and circuitry of this type find substantial utility in many types of modern electronic equipment, of which electronic computers, registers, calculators, and many other similar items, are well-known examples of various machines and types of apparatus which employ extensive electric circuits and sub-groups of electric circuits which are to be interconnected to principal circuits, or otherwise, of various kinds.

Much of the equipment of this type utilizes low current-carrying conductors, and many of the electrical components and elements embodied in the modules and circuitry are of very small dimensions, whereby, particularly for purposes of conserving space, the mechanism and electrical connecting means readily lend themselves to miniaturization. By way of example, certain of the modules may have element-containing bodies of the order of ½" square and approximately ⅛" thick, there being sufficient space therein to accommodate between 10 and 20 diodes, for example, having leads respectively connectable to different contacts carried by the body of the module.

Whereas various kinds of connectable and disconnectable electrical means have been utilized heretofore which include soldered connections or binding posts having threaded clamping nuts and the like, present manufacturing and servicing requirements, and especially the miniaturization of suitable electrical components for use in electrical equipment of the type referred to hereinabove, no longer permits the use of such well-known type of electrical connecting means. This is particularly found to be so in regard to equipment which requires rapid substitution and exchange of certain electrical modules, either for service replacement, or otherwise. However, the electrical connecting means employed for coupling the components of the modules to the circuitry of the memory frame matrix, for example, must be such that electrical connection and maintenance of circuitry must be sure and durable, principally through the employment of frictionally engageable, mechanical contact means.

It is the principal object of the present invention to provide electrical connecting means especially suited for the coupling of a plurality of electrical modules, each embodying a plurality of electrical elements, to circuitry provided, for example, upon an elongated rigid support having recesses or slots therein arranged to receive pluggable means provided on said modules, said pluggable means and circuitry respectively being provided with electrical contact elements of complementary natures, and each pair of contact elements providing a plurality of firm, frictional engagements, under reasonable pressure, to insure durability and continuity in the electric circuit between the elements of the module and the circuitry on the support over long periods of time, and even after sustained periods of idleness in operation of the circuit.

Another object of the invention is to provide elongated support frames for memory circuit conductors, for example, the elongated frames having a row of module slots or cavities therein, and said frames being relatively thin in a direction perpendicular to the plane of said slots, whereby such frames lend themselves to being stacked one upon another to provide a maximum amount of circuitry in a minimum amount of space, such circuitry being of the type capable of having modules, such as those containing a plurality of diodes, quickly plugged into the module slots or recesses in said frames and removed therefrom, as occasion demands. Said modules preferably project outwardly from the frame to which they are connected substantially within the plane of the module slots and the thickness of said modules is no greater than the thickness of said frame to which they are connected, whereby adequate accessibility to said modules for exchange and replacement is provided.

A further object of the invention is to provide interengageable contacts respectively connected to the circuitry on said elongated supporting frames and the pluggable means on said modules, said contacts connected to at least one of said interconnectable items being of novel construction, particularly in regard to the mechanism by which the same are secured to the means supporting said contacts, the nature of such securing mechanism permitting inexpensive manufacturing of the contacts and the assembly and connection thereof with the supporting member therefor while providing firm and long-lasting connection of said contact to its supporting member.

Still another object of the invention ancillary to the immediate foregoing object is the formation and utilization of channel-type female contacts formed from sheet metal on punch presses utilizing progressive dies and including preferably adjacent the opposite ends of the channels of said contacts, oval projections extending from the base of said channels in directions opposite to the sides of the channels, the longitudinal axes of said oval projections normally being perpendicular to the base of the channels, but said oval projections being quickly distorted by a punching operation substantially to dispose the longitudinal axis of the oval transversely to its original position. As a result of this, the ends of the oval projections extend into engagement with undercut shoulders on the supporting means for the channel contact, thereby firmly securing the contact to its supporting means and preventing not only removal of the contact from a supporting groove in a direction outwardly from the open face of the groove, but also in either direction longitudinally of the axis of said groove and channel contact.

Details of the foregoing objects and of the invention, as well as other objects thereof, are set forth in the following specification and illustrated in the accompanying drawings comprising a part thereof.

In the drawings:

FIGURE 1 is a perspective view of an exemplary arrangement of a plurality of memory frame matrices arranged in a vertical stack, portions of said matrices being broken away to illustrate details thereof and said figure also illustrating an exemplary module positioned in operative relationship with a portion of one of said matrices and another module being illustrated in removed relationship with respect to the matrices and cover members of the module being removed therefrom in exploded fashion to illustrate details of the module.

FIGURE 2 is an enlarged vertical section of the exemplary electrical apparatus illustrated in FIGURE 1 and illustrating both a module mounted operatively with respect to one matrix of the assembly thereof and another module in position to be connected to another matrix of the assembly, said modules also being illustrated in vertical section to show certain details thereof, including the contact means.

FIGURE 3 is a fragmentary, still further enlarged, vertical sectional view generally taken on the line 3—3 of FIGURE 2 and showing in exemplary manner a female channel contact in position to be inserted into a supporting slot therefor, said view also illustrating a similar contact which has been inserted in its supporting slot and the connecting means thereof have been arranged to secure the channel contact to such supporting means.

Figure 1:
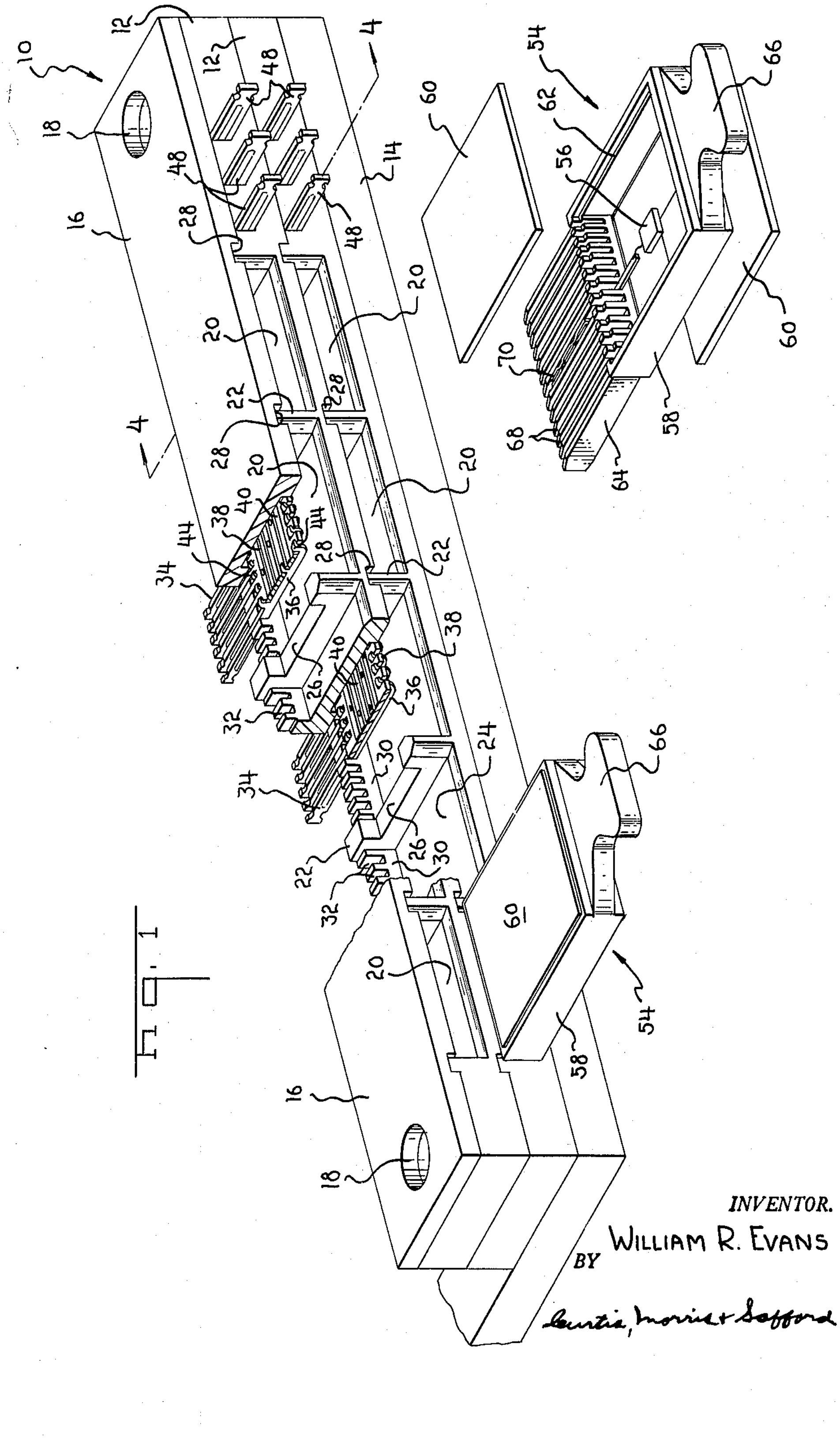

To facilitate the description of the present invention, a specific application thereof has been selected, which, without restriction thereto, comprises an electrical unit known in the trade as a memory frame 10. In accordance with the principles of the present invention, said frame is composite and, in the specific illustration shown in FIGURE 1, two spacer sections or members 12, which are relatively thin and elongated, are stacked upon each other. The lowermost one is secured to a base plate 14 and a cover or cap plate 16 fits upon the top surface of the uppermost spacer section 12 as clearly shown in FIGURE 1. All of the vertically stacked members referred to above are provided with axially aligned holes 18 through which suitable bolts or screws, not shown, may bet inserted to connect the assembly together as a unit.

The spacer sections 12 are provided with a series of side-by-side module slots or recesses 20. These are capable of being formed readily inasmuch as, in the preferred construction of the components of the memory frame, all of the same are fabricated, preferably by molding, from suitable insulating material such as appropriate synthetic resins of the required dielectric and physical properties. As will be seen from FIGURE 1 especially, the module slots 20 comprise a plurality of vertical partition members 22 extending upward from planar base surfaces 24. The upper surfaces of the partition members 22 are provided with flat recesses 26, and the terminal ends of the partition members 22, which somewhat resemble short posts, extend into suitable molded notches 28 formed in the lower surfaces of the various spacer sections 12 and cover plates 16 as clearly shown in FIGURE 1.

As viewed in FIGURE 1, the rear edge of each spacer section 12 has a narrow wall 30 extending upwardly from the planar surface 24, the same being provided with a series of narrow notches 32 through which electrical conductors such as metal tabs 34 extend. In at least one form of construction to which the present invention lends itself, such tabs are integral projections of blade-like male contact members 36, further details and functions of which will be described hereinafter.

Supported within the recesses 26 with respect to each of the spacer sections 12 is an elongated, flat, circuit side rail or contact bar 38, which, preferably, is a suitable strip of insulating material, such as an appropriate synthetic resin, having suitable stiffness to remain substantially flat during use. Said contact bar 38 preferably fits quite closely between the ends of the recesses 26 in order to position the same accurately with respect to the spacer sections 12, especially in directions transverse to the longitudinal axis thereof. In effect, therefore, the contact bars 38 comprise the upper wall or surface of module slots 20. As best seen in cross-section in FIGURES 2 and 4 through 6, the contact bars 38 also support on the upper surfaces thereof a plurality of relatively thin, parallel ribbon-like electrical conductors which, for purposes of ready reference, will be referred to as bus bars 40. Suitable apertures are formed at appropriate locations in selected bus bars 40 in order to establish electrical contact between such selected bus bars and otherwise selected metal tabs 34 and male contact members 36 connected thereto.

Figures 2, 4:
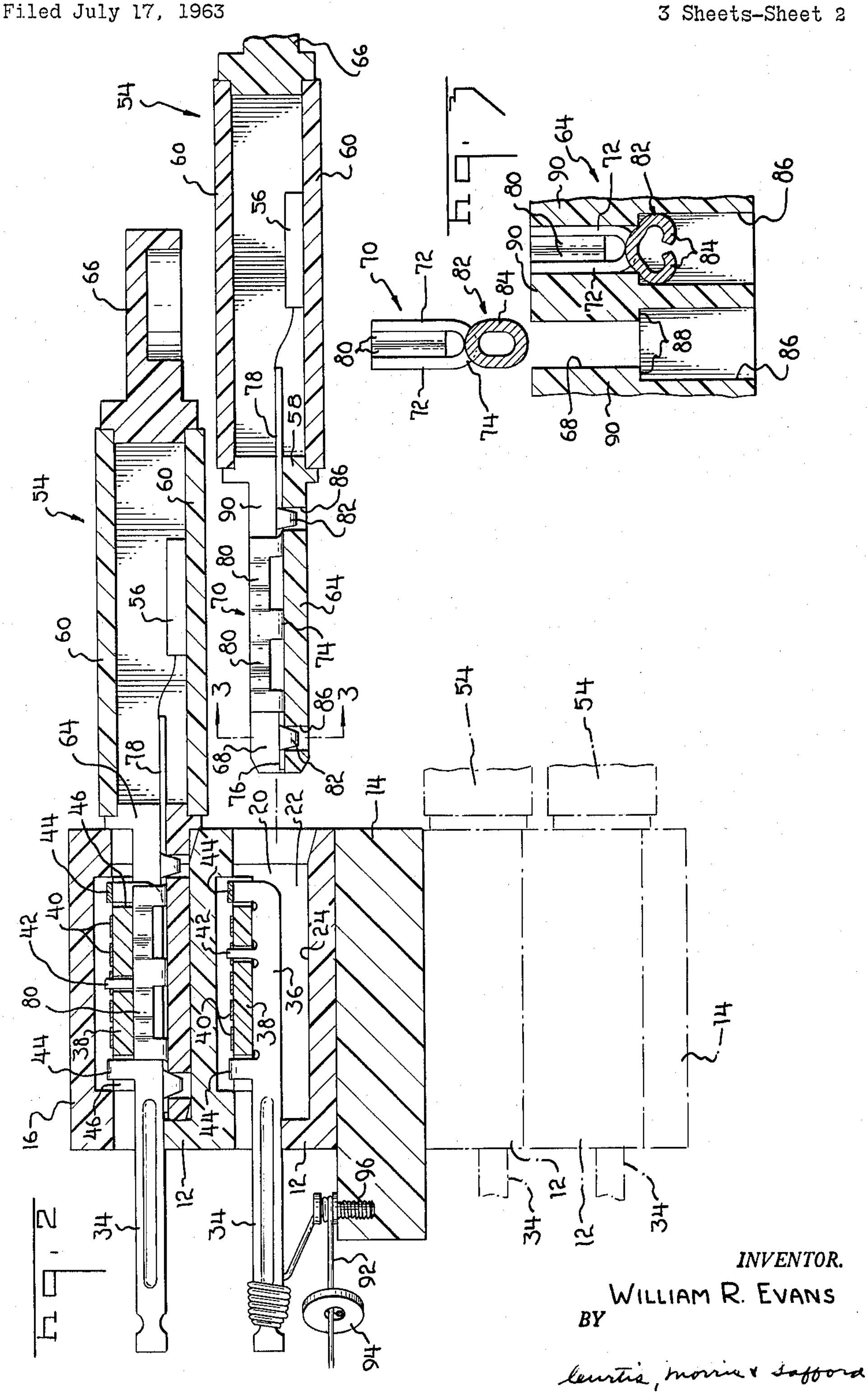
FIGURE 4 is a transverse sectional view taken on the line 4—4 of FIGURE 1 and illustrating the manner in which ground and shield tabs and common voltages are connectable to the circuitry of the assembled matrices.
Figure 4:
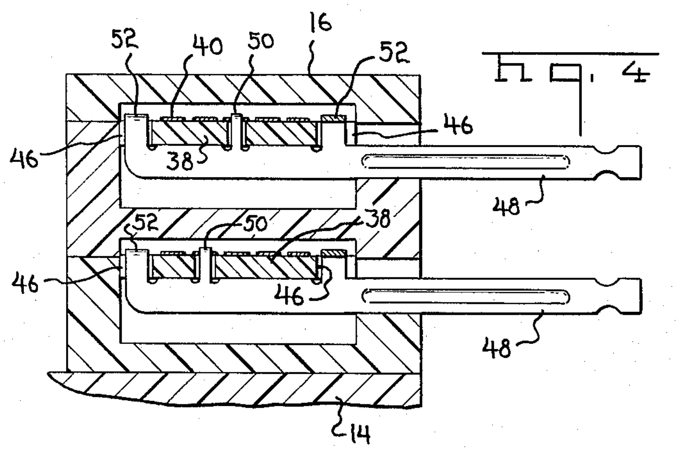
Figure 5:
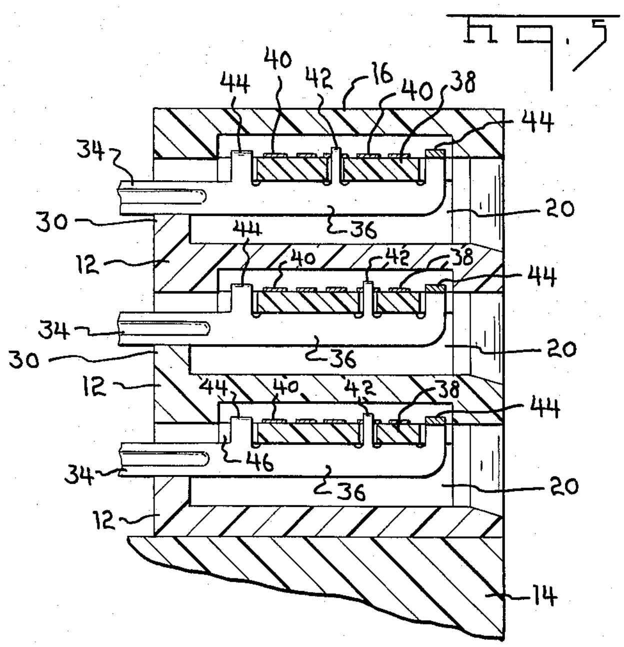
FIGURE 5 is another vertical section view through a different stacked arrangement from that shown in FIGURE 4 and illustrating the preferred exemplary means for connecting male bar-type contacts to the circuitry on said stacked matrices, said contacts also having tabs projecting from one end thereof for connection to various kinds of circuit wires.
Figure 6:
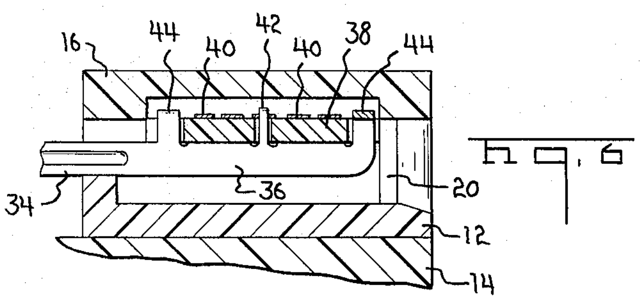
FIGURE 6 is another vertical sectional view similar to FIGURE 5, but illustrating only a single matrix, as distinguished from the stack thereof shown in FIGURE 5, to illustrate the versatility of certain aspects of the present invention.

As readily can be seen from FIGURES 2 and 5, but also as shown in a smaller scale in FIGURE 1, the upper edges of the male contact blades 36 are provided at appropriate locations with at least one, relatively narrow contact finger 42 which is differently located on different contact blades 36 as can be seen with respect to the upper and lower contact blades 36 in FIGURE 2, for example. The purpose of this is that, at least in most uses of the invention, each contact blade 36 will be connected electrically to only a single selected bus bar 40 and this is accomplished by projecting the upper end of the appropriately positioned contact finger 42 through an aperture in the selected bus bar and the upper end of finger 42 then is bent over or clinched so as to at least partially overlap the bus bar 40. Preferably, firm electrical contact is insured through soldering.

In order to provide firm connection of the contact blades 36 with the under surface of the contact bars 38, each of the blades 36, adjacent the opposite ends of that portion of each which serve as contact blades, are provided with connecting ears 44. The upper ends thereof extend through a series of evenly spaced notches 46 formed in the opposite edges of the contact bar 38, the upper ends of the ears 44 being bent over the upper surface of contact bar 38 so as to clinch the ears and thus securely connect the contact blades 36 to the respective contact bars which support the same.

For purposes of connecting the contact bars 40 either to appropriate additional circuits or ground, as will be seen from FIGURES 1 and 4, the memory frames 10 and especially the spacer sections 12 are provided with suitable transverse notches or openings to accommodate common, ground, or shield tabs 48 which, respectively, are connected to appropriate bus bars 40, several specific examples of which are illustrated in FIGURE 4 wherein it will be seen that the contact fingers 50, respectively provided on the upper and lower tabs 48, each engage bus bars which are not vertically aligned. In accordance with conventional practice, said tabs also are provided with connecting ears 52 which extend upward through additional notches 46 in the edges of contact bars 38, the upper ends of the connecting ears 52 being clinched similar to the connecting ears 44 of the contact blades 36.

Further in regard to the specific illustration selected for purposes of concisely explaining the principles of the present invention, the drawings comprising a part of this specification illustrate modules 54 which, among other items, can contain a plurality of diodes 56, of which a single one is illustrated, somewhat diagrammatically, in FIGURES 1 and 2. As indicated hereinabove, the modules 54, especially in regard to containing certain currently used electrical units and items, such as diodes, may be of quite small dimensions, such as of the order of ½" square and possibly ⅛" thick, although these dimensions are not to be regarded as restrictive. They merely illustrate one example of miniaturization to which the present invention is applicable. As best shown in exploded fashion in FIGURE 1, the exemplary, fully illustrated module 54 therein comprises a hollow body 58 and, for purposes of facilitating manufacturing and assembly, said body is either substantially square or rectangular in plan view and the opposite faces thereof are open. Top and bottom cover plates 60 may be secured by cementing or otherwise to the seats 62 formed in the upper and lower edges of the sides defining the body 58, as clearly shown in FIGURES 1 and 2, or one of such plates may be molded integrally with the body.

Each of the modules 54, all of which preferably are uniform in size, shape and construction, is provided with plugable means received within the module slots 20 of the memory frame 10. In the specific illustration utilized in the drawings, such plugable means comprises a substantially rectangular plug 64, which, in its preferred construction, is formed by molding from suitable synthetic resin integrally with the body 58 of each module. Such modules also likewise are provided with integral manually-engageable means such as handle 66 which project from the edge of the module opposite that from which the plug 64 extends.

As also is well illustrated in FIGURES 1 and 2, it will be seen that the body 58 and plug 64, as well as handle 66 of each module 64, preferably are co-planar. Further, it will be seen especially from FIGURE 2, that when the plugs 64 of the modules are received within the module slots 20 therefore, with reasonable clearance, the thickness of the spacer sections 12 with relation to the vertical dimension of all portions of the module in directions transverse to the plane of the spacer sections 12 is less than the corresponding vertical dimension of each of the spacer sections 12, whereby each module readily may be manipulated, for replacement or repair, for example, incident either to withdrawing the same from or replacing the same within any selected module slot 20 of the memory frame 10.

If desired, suitable legends may be imprinted or otherwise formed upon the upper faces of the bodies of the modules, or upon the handle 66 thereof, such legends employing code, or otherwise, to indicate the nature of the contents and/or function of each module, particularly as dictated by the contents of the cavity comprising the interior of body 58 of each of the modules.

Figure 7:
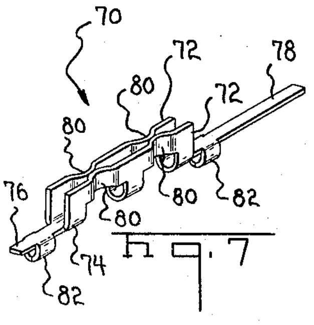
FIGURE 7 is a perspective view of an exemplary female contact.

As best seen from FIGURES 1 and 2, the upper surface of the plug 64 is provided with a plurality of similar parallel grooves or slots 68 which, as seen with respect to the lower exemplary module 54 shown in FIGURE 2, extend downwardly substantially halfway through the plugs 64. The slots 68 receive very small, flexible female channel contacts 70. As best shown in FIGURES 3 and 7, these contacts comprise opposite sides 72 and bottoms 74, the opposite ends of said bottoms respectively having projections 76 and 78, the latter preferably being longer than the former for purposes of providing a tab, for example, leading to one of the exemplary diodes 56, as shown best in FIGURE 2.

The female channel contacts 70 preferably are formed from resilient sheet metal, such as by a stamping operation employing a progressive die, to form not only the sides 72 and bend the same into a channel with respect to the bottom 74, but also to provide the opposite sides with one or more arcuate sections 80, intermediately of the ends of the channel. These insure multiple firm physical coengagement between the female channel contacts 70 and the opposite surfaces of the male blade contacts 36 when the same are slidably interengaged incident to inserting the modules 54, and particularly the plugs 64 thereon, into the module slots 20. It will be seen especially from FIGURES 5 and 6 that the male blade contacts 36 extend downward from the surfaces defining the upper wall of each of the module slots 20. Preferably, the opposite ends of the sides 72 of the female channel contacts 70 are slightly flared outwardly to insure ready reception of the leading end of the male blade contacts 36 into the forward end of the channel of the female contacts.

Preferably, the height of the sides 72 of the channel contacts 70 are no greater than the depth of the grooves 68, which receive such channel contacts. Thus, when the male blade contacts 36 are received within said channel contacts, as when the module plugs 64 are fully inserted within the module slots 20, each pair of coengaged male and female contacts, and especially the latter, will be disposed substantially entirely between insulating barriers comprising the walls on plugs 64 between the parallel grooves 68, said walls preferably extending substantially to the undersurface of the contact bars 38.

One of the features of the present invention which particularly contributes to the capability of the present invention being miniaturized and rendered compact comprises the means by which the female channel contacts 70 are secured within the parallel grooves 68. Such means is best illustrated in FIGURE 3, in cross-section, and in side elevation in FIGURE 2 with respect to the lowermost, withdrawn module 54 in the latter figure. By reference to these figures, it will be seen that, preferably, there is provided, adjacent each end of the channel of the female contacts 70, connecting means 82 which actually are affixed to the projections 76 and 78 comprising extensions of the bottom 74 of said channel. These connecting means comprise what initially are oval rings or loops, the major axis of which is parallel to the plane of the channel, as shown particularly in FIGURE 3 relative to the non-inserted channel shown in said figure. This may also be referred to as a vertical oval.

Said vertical ovals are formed from the same material as that from which the channel contacts are formed and are integral therewith. Progressive dies are highly suited for forming said ovals incident to stamping and punching the contacts from sheet metal. In the preferred construction, a pair of opposed semi-oval ears 84 are bent so as to dispose the ends thereof substantially into engagement, the resulting ovals preferably being substantially no wider than the channels when the same are inserted into the grooves 68 by appropriate tools or pushing blades. It will be realized, of course, that the sides 72 of the channels are not necessarily parallel to each other prior to insertion within the grooves 68, but they are ultimately disposed in parallelism when the channels are fully forced into the grooves 68 and the stresses imposed upon said sides aid in maintaining firm positioning of said channels within said grooves.

Communicating with the bottoms of the grooves 68 and extending upward from the lower surfaces of the plugs 64 of the modules are openings 86, which, in the exemplary form shown in FIGURES 2 and 3, are rectangular in cross-section and of greater transverse dimension than the width of the grooves 68, thereby providing undercut shoulders 88. If desired, the openings 86 may be connected through the medium of utilizing transverse grooves extending upward from the lower surfaces of the plugs 64, inasmuch as the walls 90 between the grooves 68 will connect the remaining lower portions of the plugs 64 together.

After the full insertion of the preformed channel contacts 70 within the grooves 68, and while the inserting blades or tools hold the channel contacts in said grooves, a small punch having an appropriate face thereon is introduced through the openings 86 to engage the lower ends of each of the vertical ovals 82, so as to upset and spread the same transversely substantially into the configuration thereof shown in the right-hand opening 86 in FIGURE 3, whereby portions of the semi-ovals 84 will firmly be disposed against the undercut shoulders 88 and thereby firmly retain the female contacts within the grooves 68, especially against removal of the contacts upwardly from the grooves 68.

The dimensions of the semi-ovals 84, especially in the direction of the longitudinal axis of the channel contacts 70, is so arranged, and the spacing of the connecting means 82 with respect to each other, likewise, is so arranged that when said connecting means are disposed within the pair of openings 86, the adjacent edges or faces of the connecting means 82 respectively engage the adjacent vertical surfaces of the opening 86 so as to prevent longitudinal movement of the channel contacts 70 with respect to the grooves 68. This is particularly important incident to inserting the plug 64 and the contacts carried thereby into the module slot 20 for which it is intended, and particularly for effecting engagement of the female contacts 70 with the male blade contacts 36 which are fixed to contact bar 38 of each spacer section 12 and therefore are firmly secured relative to the upper wall of the module slots 20.

It also is to be understood that while the present invention has specifically illustrated a pair of semi-ovals 84 to comprise the connecting means 82, only a single ear conceivably may be employed, if desired, the same being arranged to comprise an oval, which otherwise functions similarly to the pair of semi-ovals 84, for purposes of securing the female contacts within the grooves 68.

From the foregoing, it will be seen that the present invention provides effective and readily manufacturable means for providing highly versatile exchangeability and replacement with respect to modules which are to be connected to and disconnected from circuitry provided in other electrical structures such as memory frames and the like. Simple insertion of plug means on the modules within module slots 20 of the main supporting frame is all that is required to establish electrical connection between the electrical items or elements carried by the modules and the circuitry carried by the main frame to which the modules are connected and from which they quickly and easily are disconnected by simple withdrawal of the modules from the slots provided therefor in the frame. Because of the composite nature of the supporting frame 10, which is specifically described as being a memory frame, but without restriction thereto, it is possible to achieve substantial and extensive stacking of as many or as few spacer sections as are desired, thereby affording extreme compactness coupled with the possibility of effective miniaturization without loss of durable and reliable electrical contacts being established between the elements in the modules and the circuitry in the supporting frame.

It will be apparent to the skilled in the art that tabs 34 may be connected to the associated apparatus in any suitable fashion according to the conditions of the particular use of the connector system. In FIGURE 2, for example, a grid wire 92 passing through magnetic toroid 94 is shown, for purposes of diagrammatic illustration, wrapped around a stud 96 fixed to base plate 14 and then led to and connected electrically and mechanically with the end of tab 34. Other arrangements, such as providing tabs 34 with right angle extensions to pass through apertures in a conventional printed circuit board to which spacer members 12 may be affixed rather than to base 14, are considered to be within the purview of the invention.

While the invention has been described and illustrated in its several preferred embodiments, it should be understood that the invention is not to be limited to the precise details herein illustrated and described since the same may be carried out in other ways falling within the scope of the invention as claimed.

I claim:

1. Electrical connecting means for coupling one or more electrical modules embodying electrical elements to circuitry on an elongated rigid support and comprising in combination, an elongated rigid frame having a row of similar slots extending thereinto from one side transversely to the axis thereof, electrical circuit means extending longitudinally along said frame, parallel contact members suported adjacent one wall of each slot and extending transversely to the axis of said frame, said contact members being connected electrically to said circuit means, electrical modules having a compartment arranged to contain electrical elements to be connected to said circuit means and plug means complementary to said slots in cross-section and extending from one end of each module, mating parallel contact members carried by said plug means for engagement with said contact members in said slots when said plug means are disposed within one of said slots, said frame being relatively thin in a direction perpendicular to the plane thereof and said modules being no thicker than said frame, whereby two or more frames may be stacked with modules connected thereto without interference therebetween for removal and connection to said modules relative to said frames.

2. The electrical connecting means set forth in claim 1 further characterized by said parallel contact members arranged within the slots being of male bar and said mating parallel contact members carried by said plug means being of female channel open at the top and at least at one end so as slidably to receive said male bar type from said open end thereof.

3. The electrical connecting means set forth in claim 1 further characterized by said modules being flat and of substantially uniform thickness, said plug means being substantially co-planar with said modules, and said modules also having manually engageable means extending therefrom oppositely to said plug means.

4. The electrical connecting means set forth in claim 1 further characterized by said modules having a flat body and said plug means being substantially co-planar therewith and one face thereof being grooved to contain the contact members carried by said plug means.

5. Electrical connecting means for coupling one or more electrical modules embodying electrical elements to circuitry on an elongated rigid support and comprising in combination, an elongated rigid frame having a row of similar slots extending thereinto from one side transversely to the axis thereof, electrical circuit means extending longitudinally along said frame, parallel male bar contact members supported adjacent one wall of each slot and extending transversely to the axis of said frame, said bar contact members being connected electrically to said circuit means, electrical modules having a body provided with a compartment arranged to contain electrical elements to be connected to said circuit means and plug means of insulating material substantially co-planar with said body and complementary to said slots in cross-section, said plug means extending from one end of each module and having parallel channels therein, and mating parallel female contact members positioned within said channels of said plug means and arranged to engage said bar contact members in said slots slidably when said plug means are disposed within said slots.

6. The electrical connecting means set forth in claim 5 further including wall-forming means for said slots and said bar contact members being positioned thereon within said slots and having ears projecting through said wall-forming means, said electrical circuit means comprising bus bars carried by said wall-forming means by portions thereof opposite said slots and said ears of said male contacts being connected to selected bus bars.

7. The electrical connecting means set forth in claim 6 further including tabs extending from one end of each male contact bar for connection to additional circuit means with which the circuitry on said frame is to be associated, the opposite ends of said male contacts being arranged for slidable entry into said female contacts carried by said electrical modules.

8. The electrical connecting means set forth in claim 5 further characterized by said frame being composite and comprising base means, spacer means formed to provide a row of said module-receiving slots therein, a contact bar extending along said spacer means, and a cap plate; all of said aforementioned means being substantially equal in length and arranged to be stacked and connected together to form said frame, said spacer means and contact bars being interfitting to form a row of said slots and a plurality thereof being capable of being stacked vertically to provide a desired capacity of module-receiving slots in an assembled composite frame.

9. Electrical connecting means for coupling one or more electrical modules embodying electrical elements to circuitry on an elongated rigid support and comprising in combination, an elongated rigid frame having a row of similar slots extending thereinto from one side transversely to the axis thereof, electrical circuit means extending longitudinally along said frame, parallel contact members supported adjacent one wall of each slot and extending transversely to the axis of said frame, said contact members being connected electrically to said circuit means, electrical modules supporting electrical elements to be connected to said circuit means and having plug means complementary to said slots in cross-section and extending from one end of each module, said plug means having a plurality of parallel grooves extending lengthwise along said plug means, mating parallel contact members carried by said plug means respectively within said grooves for engagement with said aforementioned contact members in said slots when said plug means is disposed within one of said slots, said plug means having openings extending thereinto from the surface thereof opposite the surface containing said grooves, and said openings intersecting the bottoms of said grooves, and connecting means on said contact members in said grooves extending into said openings in said plug means to secure said contact members thereto within said grooves.

10. The electrical connecting means set forth in claim 9 further characterized by said contacts in said slots being male bar-type contacts and said mating contacts in said grooves being channeled female contacts open at least at one end to slidably receive said bar-type male contacts, and said connecting means comprising deformable projecting elements extending downwardly from said female contacts into said openings and interlocking therewith when deformed.

11. The electrical connecting means set forth in claim 10 further characterized by said connecting means being oval shaped rings of which the major axes extend initially in the direction of the planes of the channels of said contacts and said openings providing undercut surfaces adjacent the bottoms of the grooves in said plug means, said oval shaped rings being deformed to dispose the major axes of said rings transversely to the original direction thereof and dispose said rings in locking engagement with said undercut surfaces to lock said female contacts within said grooves.

12. The electrical connecting means set forth in claim 11 further characterized by said female contacts being provided with one of said oval rings adjacent each end of the channel thereof and said plug means having said openings positioned therein in complementary arrangement to said rings to receive the same.

13. Electrical contact means comprising a metallic channel member formed from sheet material, the opposite ends of the base of said channel extending outward longitudinally, at least a single ear extending laterally from one of said end extensions and curved away from the base of the channel in the opposite direction from the sides of said channel to form at least part of an oval loop having a longitudinal axis perpendicular to the base of said channel, and a board-like support member having similar parallel grooves extending inward from one face thereof and arranged to receive said channel contacts to support the same, said support member having openings formed through said support member from the bottoms of said grooves adjacent opposite ends of said channel contacts and of larger cross-sectional dimensions than the width of said grooves to provide undercut shoulder surfaces and said oval loop being deformed to extend portions of the same against said shoulder surfaces to secure said channel contacts to said support member.

14. The electrical contact means set forth in claim 13 further characterized by said oval loop being formed from a pair of ears respectively extending from opposite edges of said end extensions and curved around toward each other to form said oval loop.

15. The electrical contact means set forth in claim 14 further including an oval loop adjacent each end of said channel contact, said loops respectively extending into said openings adjacent said opposite ends of said channel contacts to secure the opposite ends of said channel contacts firmly within said grooves of said support member.

16. The electrical contact means set forth in claim 15 further characterized by the position of said oval loops on said channel contacts relative to said openings in said support member being arranged so that the corresponding ends of said loops engage adjacent end surfaces of said openings to prevent longitudinal movement of said channel contact relative to said support member.

References Cited by the Examiner

UNITED STATES PATENTS

| | | | |
|---|---|---|---|
| 2,861,253 | 11/1958 | Johanson | 339—217 |
| 2,885,603 | 5/1959 | Rose | 317—101 |
| 2,913,634 | 11/1959 | Scoville | 317—101 |
| 3,047,832 | 7/1962 | Deakin | 339—217 |

KATHLEEN H. CLAFFY, *Primary Examiner.*

JOHN F. BURNS, *Examiner.*

JOSEPH J. BOSCO, *Assistant Examiner.*